United States Patent [19]

Dorffler et al.

[11] Patent Number: 5,410,966
[45] Date of Patent: May 2, 1995

[54] HIGH RELIABILITY MODEL ROCKET ENGINE IGNITER SYSTEM

[75] Inventors: Michael K. Dorffler, Canon City; Ronald L. McClaren, Pueblo, both of Colo.

[73] Assignee: Centuri Corporation, Penrose, Colo.

[21] Appl. No.: 207,893

[22] Filed: Mar. 7, 1994

Related U.S. Application Data

[63] Continuation of Ser. No. 973,769, Nov. 9, 1992, abandoned, which is a continuation-in-part of Ser. No. 858,109, Mar. 26, 1992, abandoned.

[51] Int. Cl.$^6$ .............................................. F42C 19/12
[52] U.S. Cl. ............................... 102/202; 102/275.12; 102/202.9; 102/202.11; 60/39.823
[58] Field of Search ................ 102/202, 202.9, 202.11, 102/275.12; 60/39.823

[56] References Cited

U.S. PATENT DOCUMENTS

| | | | |
|---|---|---|---|
| 2,720,749 | 10/1955 | Beebe, Jr. | 60/256 |
| 2,776,623 | 1/1957 | Bonner | 102/202 |
| 2,796,024 | 6/1957 | Swaim | 102/275.12 |
| 3,332,353 | 7/1967 | Burkardt et al. | 102/202 |
| 3,363,559 | 1/1968 | Estes | 102/28 |
| 3,422,763 | 1/1969 | Wait | 102/202 |
| 3,503,333 | 3/1970 | Estes | 102/28 |
| 3,695,179 | 10/1972 | Rainone et al. | 102/202.4 |
| 3,974,819 | 8/1976 | Held | 124/17 |

(List continued on next page.)

FOREIGN PATENT DOCUMENTS

| | | | |
|---|---|---|---|
| 2151495 | 4/1973 | France | 102/202 |
| 500820 | 11/1954 | Italy | 102/202 |

OTHER PUBLICATIONS

"Cox Model Rocket Engines: Instructions," L. M. Cox Manufacturing (2 pages).
"Model Rocketry Technical Manual," Estes Industries. (2 pages).
"Rocket Motors With TigerTail II Igniters: Instructions and Safety Information" (Pamphlet), Quest Aerospace Education Inc. (2 pages) (no date).
"Starbird: Flying Model Rocket" (Brochure), Estes Industries.
"1992 Flying Model Rocket Catalog: 22 All New Kits and Accessories," Estes Industries, p. 62, 1992.
"Educator Catalog: Ignite The Imagination Through Learning," Selecting the Proper Rocket Engine, Estes Educator Industry, p. 9, 1992.
"Flip Chart and Reproduction Masters," Igniter Plug Technology (Brochure). Estes Educator Industry, No. 8405, p. 11, 1992.
"Model Rocket News," Estes Industries, vol. 31, No. 2, Issue 91, p. 14, Winter 1992. (3 pages).
"News," Estes Educator, vol. 17, No. 2, p. 8, Fall 1992.
"Hobby Merchandiser," Trade Magazine, pp. 1-2, 13, 20, 25, 63-64, 79, 81, 100. Jul. 1992.
"Model Rocket News," Estes Industries, p. 10, Summer 1992.
"News," Estes Educator, vol. 17, No. 1, p. 9, Spring 1992.
"1991: Flying Model Rocket Catalog," Estes Industries, pp. 2-3, 1991.

(List continued on next page.)

Primary Examiner—Stephen M. Johnson
Attorney, Agent, or Firm—Lahive & Cockfield

[57] ABSTRACT

A reusable, semi-flexible molded model rocket engine igniter holder is used to hold an electrically activated igniter in intimate contact with the exposed surface of the model rocket engine propellant until the rocket engine propellant is ignited by passing electrical current through the igniter. The igniter holder, which is inserted in the throat cavity of the rocket engine, is preferably molded with a series of ribs around its periphery which impart a holding force keeping the electrical igniter in place in the engine throat.

12 Claims, 2 Drawing Sheets

U.S. PATENT DOCUMENTS

| | | | |
|---|---|---|---|
| 4,002,882 | 1/1977 | McCuthchen | 219/499 |
| 4,355,577 | 10/1982 | Ady et al. | 102/378 |
| 4,405,890 | 9/1983 | Hicks, Jr. | 320/2 |
| 4,573,316 | 3/1986 | Carrier et al. | 60/39.823 |
| 4,655,137 | 4/1988 | Boltz | 102/202 |
| 4,751,881 | 6/1988 | Fauconnier et al. | 102/202 |
| 4,799,428 | 1/1989 | Yunan | 102/275.12 |
| 4,930,393 | 6/1990 | Castro, Jr. | 89/1.8 |
| 5,004,441 | 4/1991 | Hammerly et al. | 446/211 |

OTHER PUBLICATIONS

"Composite Model Rocket Motor: Instructions," AeroTech, Inc., 1989 (2 pages).

"Model Rocketry: The Classic Collection" (Catalog), Estes Industries, pp. 3–6, 21–24, 28–29, 1988.

"News", Estes Educator, vol. 17, No. 2, p. 8, Fall 1992.

"Model Rocket News", Estes Winter 1992, vol. 31, No. 2, Issue 91, p. 14.

"Model Rocket News", Estes, Summer 1992, p. 10.

"Hobby Merchandiser", Trade magazine pp. 13,20,25,63,81,100. (Jul. 1992).

"Composite Model Rocket Motor Instructions", Aerotech, Inc. (1989).

"1991 Flying Model Rocket Catalog", Estes Industries, p. 56.

"Cox Model Rocket Engines: Instructions", L. M. Cox Manufacturing.

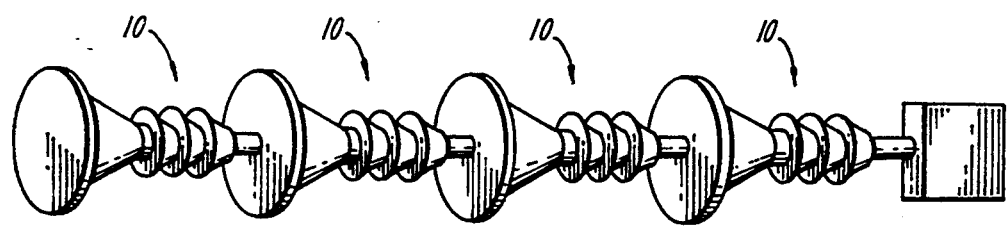
FIG. 1
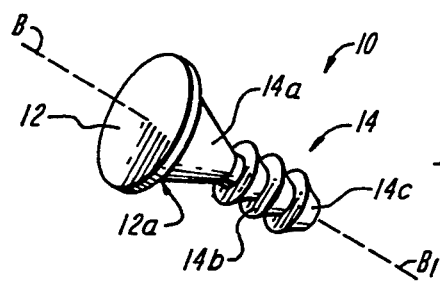
FIG. 1A
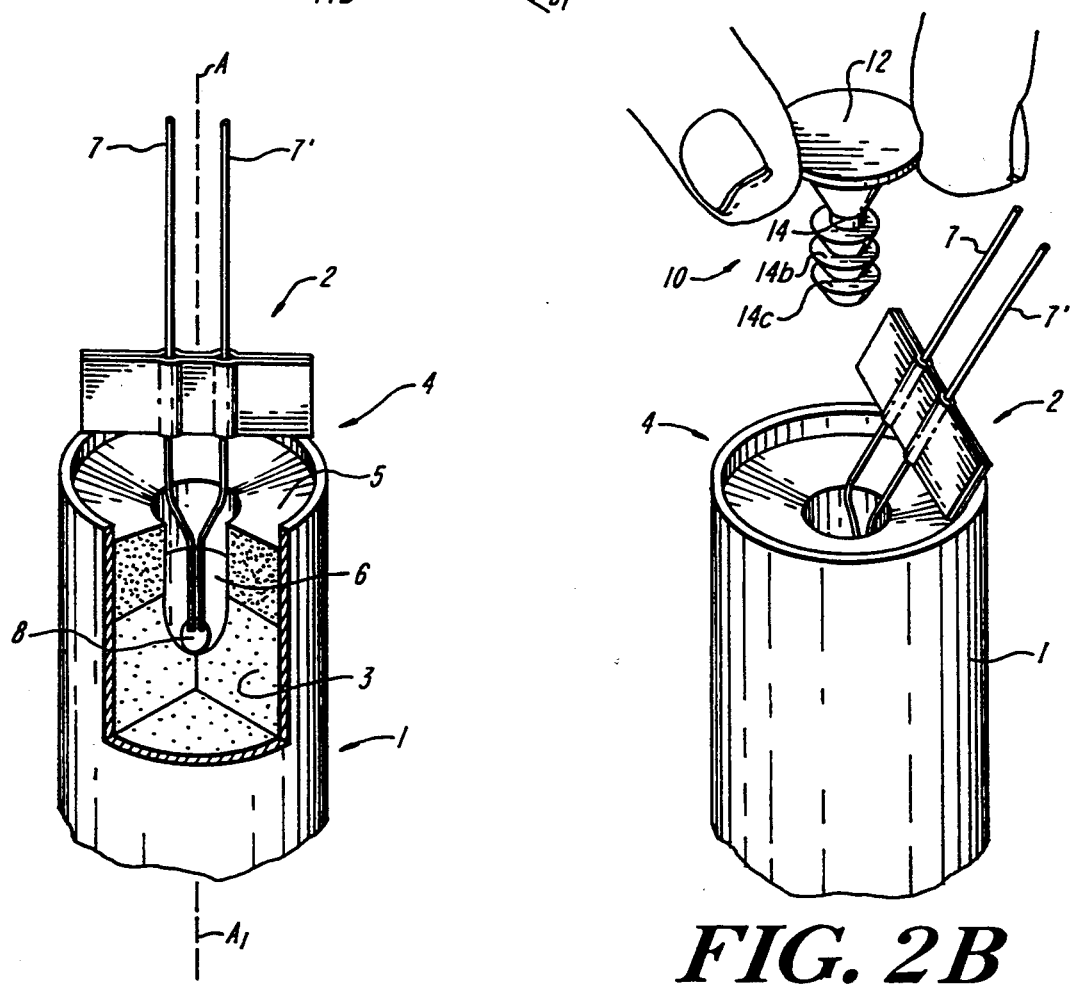
FIG. 2A
FIG. 2B

HIGH RELIABILITY MODEL ROCKET ENGINE IGNITER SYSTEM

This application is a continuation of application Ser. No. 07/973,769, now abandoned, filed on Nov. 9, 1992, which is a continuation-in-part of application Ser. No. 07/858,109, now abandoned, filed on Mar. 26, 1992, the specifications of which are incorporated herein by reference.

BACKGROUND OF THE INVENTION

This invention relates to the ignition of end burning solid propellant model rocket engines used to propel flying model rockets. The invention can also be applied to the ignition of larger end burning propellant grains in activities not related to model rocketry.

The construction and launching of model rockets has been a popular modeling activity with youngsters and adults for over thirty years. This popularity has been due primarily to the introduction of and consistent reliability of the pre-manufactured model rocket engines. For safety purposes, the propellant contained in these engines is designed to be ignited only with electrically activated igniters, where the electricity is supplied from a remote location, typically a storage battery, connected to the igniter via lead wires.

Because handling safety for these engines is always a concern, particularly with regards to youngsters, igniters sold for use with such engines are commonly designed with low margins of heat output. This igniter design limits danger to the user if he/she attempts to put the igniter to other uses.

Low heat output igniters, while quite reliable if correctly installed in the intended use model rocket engine, are also subject to high unreliability if installed incorrectly. A typical model rocket engine igniter has a pair of plated iron lead wires of approximately two inches in length separated by about one-quarter inch of a fine nickel chromium bridge wire welded to one end of each lead wire. The bridge wire is commonly coated with a relatively low caloric output pyrotechnic mixture, the quantity of which is kept to less than one-tenth gram to limit the heat output and thereby restrict any non-model rocket uses contemplated by the purchaser.

Even though the total caloric heat output of this type of igniter is quite low, it is sufficient to ignite the solid propellant grain within the model rocket engine as long as the igniter is placed in direct contact with the exposed propellant surface. If, however, the igniter is allowed to recede slightly, for example, as little as one-eighth inch, from the surface of the propellant, it is highly probable that the propellant will not be ignited when the igniter is initiated.

SUMMARY OF THE INVENTION

The igniter holder of this invention eliminates the problems associated with the need to properly position prior igniters in the model rocket engine to avoid loss of ignition heat energy. The igniter holder of the present invention serves as a mechanical positioning system which holds the igniter in the correct physical position against the exposed propellant grain. At the same time, the igniter holder forms a small isolated chamber inside the nozzle, which enhances heat energy transfer from the burning igniter to the propellant grain surface. If the igniter is coated with a pyrotechnic material, the isolated chamber significantly enhances ignition since the chamber contains and directs the heat energy from the pyrotechnic material to the propellant grain. The result is an extremely high ignition reliability, even with low battery energy.

One advantage of an igniter holder according to the invention is its extreme ease of use. A model rocket engine is held with the nozzle facing up, and the igniter is dropped into the nozzle cavity. The tip of the molded plastic igniter holder is placed in the nozzle cavity, between the wires of the igniter, and is then manually pressed into position. The forward force applied to insert the plastic igniter holder into the nozzle keeps the pyrotechnic material of the igniter in direct contact with the propellant surface. Preferably, the igniter holder also has flexible ribbing to secure the igniter in place by friction force directed along a diameter of the holder.

Another feature of the invention is that the flat diametric head of the igniter holder automatically keeps the wire igniter leads apart during installation, avoiding the possibility of an electrical short which would prohibit proper engine ignition.

Another feature of the invention is the ability to color code the plastic used in the different igniter holders which fit the various different sizes of model rocket engine nozzles. The consumer can then select the correct igniter holder for the engine chosen for a flight by color, rather than having to select by dimensions.

A further object of this invention is to provide a reusable and inexpensive igniter holder. Even though it is subjected to high temperatures at the instant of model rocket engine ignition, the design proves nearly impervious to heat and mechanical damage.

Other objects of the invention will be obvious from the remainder of the specification and will appear hereafter.

DESCRIPTION OF THE DRAWING

FIGS. 1 and 1A are lateral perspective views of a molded plastic igniter holder according to one embodiment of this invention;

FIG. 2A is a perspective view, partially cut away, of a model rocket engine showing the positioning of an electrical model rocket igniter within the nozzle, throat and propellant area;

FIG. 2B is a perspective view of the same model rocket engine with an electrical igniter in place, and showing an igniter holder according to FIG. 1A readied for insertion in the engine;

DETAILED DESCRIPTION

Figure 3:
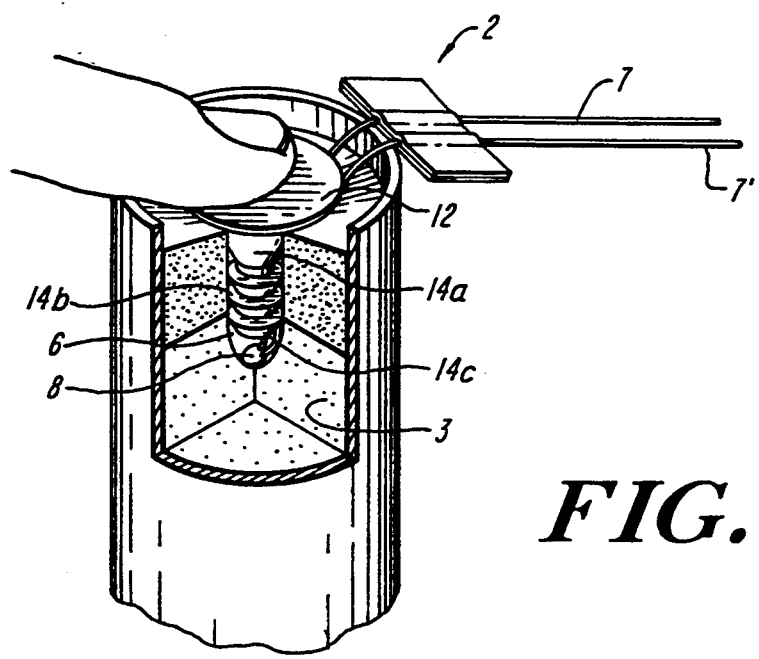
FIG. 3 is a perspective view, partially cut away, of a model rocket engine showing the positioning of an electrical model rocket igniter and the igniter holder of FIG. 1A inserted into the nozzle and throat area of the engine.

As shown in the various FIGURES, wherein corresponding parts bear corresponding reference numerals, a standard solid propellant model rocket engine 1 has a solid propellant grain 3 separated from the nozzle or exhaust end 4 of the engine 1 by a gas discharge nozzle 5. The nozzle 5 is usually made from a material such as fire clay. A central throat cavity 6 extends through the nozzle 5 and into the solid propellant grain 3 along axis A-A$_1$. This central throat cavity provides the physical means for inserting an electrical igniter for the purpose of igniting the propellant, and the diameter of the throat is mathematically defined to control the rate of burn rate of the propellant. The burn rate defines the level of thrust which propels a model rocket into the air.

In preparation for launching a model rocket, an igniter is inserted into the nozzle and throat area 6 and lead wires 7, 7' are secured to a battery operated remote launch control system. When the launch circuit is closed, the high resistance bridge wire of the igniter heats from electrical current passing through it. This heat then ignites the pyrotechnic material covering the bridge wire which in turn ignites the propellant in the model rocket engine, and the model rocket is launched.

To ensure a reliable and safe rocket launch, the igniter 2 is temporarily fixed in the throat 6 to ensure that it makes contact with the model rocket engine propellant. In addition, precautions are taken to prevent the metal or wire parts of the igniter 2 from coming in contact with each other, or the metal blast deflector of the launch pad (not shown), as this can cause an electrical malfunction, typically a short circuit.

As shown in FIGS. 1 and 1A, the igniter holder 10 according to the present invention is a semi-flexible article structured for insertion into the throat 6 of the model rocket engine 1 immediately after the igniter 2 is in place. Because the igniter 2 is somewhat mechanically fragile, particularly the pyrotechnic covering and bridge wire 8, the igniter holder 10 preferably supports the igniter 2 without damaging it. The invention provides an igniter holder structure having an axis B-B$_1$, and a flat circular end 12 for alternatively inserting and removing the igniter holder 10 from the nozzle and throat cavity 6 using minimal force, and structured with a perpendicular stem 14, axial to circular end 12.

The stem 14 holds and retains the igniter 2 and igniter holder 10 in the nozzle and throat cavity 6, until engine ignition. Further, it supports and confines the igniter 2 in the throat cavity 6 with the heating section 8 disposed to ignite the propellant in the engine. The forward end of the stem 14C forms a small volume chamber in the forward end of the ignition cavity 6. This chamber creates a condition condusive for maximum thermal heat exchange between the burning igniter pyrotechnic material 8 and the engine propellant 3. A further function of the stem 14 is to maintain separation of the igniter wires 7, 7' within the ignition cavity 6, to avoid an electrical short circuit.

The igniter holder 10 uses a one-piece construction technique, and typically is molded in in-line multiple groups, as FIG. 1 shows. The illustrated holder has, as FIGS. 1A, 2B and 3 show, a flat circular area 12 dimensioned in such a manner as to match the size of the rocket engine 1 with which it is used, and for manipulation by one or two fingers, as shown. The internal seal in the throat area 6 made by the ribbing 14B of the igniter holder 10 creates a sudden increase in gas pressure at propellant ignition which ejects the igniter holder 10, together with the spent igniter 2, from the nozzle and throat cavity 6.

The stem 14 is connected to and extends transversely along the axis of igniter holder 10 from the center of the flat circular end. The axial length of the stem matches the required depth of the engine cavity 6 so that the holder places the igniter heating section 8 in contact with the exposed surface of the propellant at the base of that cavity. The illustrated stem 14 has, in axial succession, a frusto-conical section 14A that connects at its base to the head, a circumferentially ribbed holding section 14B and a positioning end 14C. The ribs of the holding section engage the walls of the nozzle and throat cavity 6 with a slight interference fit, and preferably are bevelled barb-like structures for easy insertion and for resisting inadvertent removal, until engine ignition occurs. The positioning end 14C of the stem has a blunt, typically rounded, profile. This specific structure of the holder 10 is deemed illustrative for providing the multiple desired functions of the holder 10.

The securing function of the igniter holder 10 is important both for the novice and for the more experienced rocketeers. In the hands of the novice, the igniter holder 10 ensures reliable ignition and improved safety. More experienced rocketeers commonly experiment with other engine configurations, such as clusters which use more than one engine to launch a larger model rocket. Reliable, simultaneous ignition is critical in such an arrangement so that all engines ignite substantially simultaneously. If the igniter is not installed in each engine correctly, near-simultaneous ignition may not occur. If the rocket then launches at all, the angle of launch may be hazardous to observers and passers-by.

The material from which the igniter holder 10 is made is to be flexible enough not to damage the relatively thin wires of the igniter 2 but rigid enough to support the igniter 2 in the nozzle and throat cavity 6. The material chosen to be used for molding the part which provides all desired mechanical properties can be either polyethylene or polypropylene.

Figure 4:
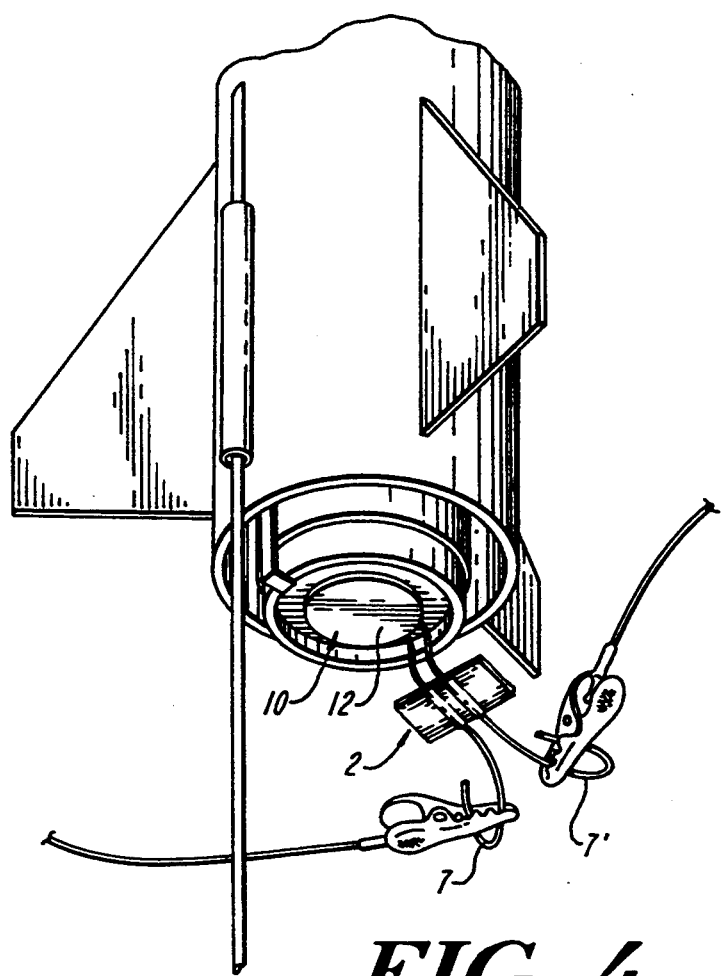
FIG. 4 is a perspective view of the base of a model rocket on a launch rod with a model rocket engine installed containing the model rocket engine igniter and igniter holder of FIG. 1A. The alligator clips indicate the typical method of attaching electrical power to the igniter.

One manner of using the igniter holder 10 is to insert it into the nozzle and throat cavity 6 as shown in FIGS. 2B and 3, after the igniter 2 has been placed in the cavity, as shown in FIG. 2A. The model rocket engine is then inserted into the rear of the model rocket to be flown, and placed on the appropriate launch pad. The lead wires 7, 7' integral to the igniter, are connected to the battery operated launch control system (not shown) or other electrical power source, by means typically illustrated as aligator clips shown in FIG. 4. The model rocket is then ready for launch.

It will thus be seen that the objects set forth above, including those made apparent from the preceding description, are efficiently attained. Since certain changes may be made in the article of the invention without departing from the scope of the invention, it is intended that all matter contained in the above description or shown in the accompanying drawings be interpreted as illustrative and not limiting. The following claims are intended to cover all of the generic and specific features of the invention herein described, and all equivalents thereto.

Having described the invention, what is claimed as new and secured by Letters Patent is:

1. An igniter holder for a solid propellant model rocket engine fitted with an igniter having a pair of lead wires having low electrical resistance and bridged by a wire of high electrical resistance, wherein the engine has a solid propellant grain section defining an igniter cavity connected to the exterior of the engine by a throat, said igniter holder comprising a semi-flexible article having an axis, a flat, disk-like end substantially perpendicular to said axis, and a stem projecting from the disk-like end along the axis of said igniter holder, wherein said stem terminates in a blunted positioning end, wherein said stem of said igniter holder is adapted for insertion into the throat of said model rocket engine fitted with said igniter, such that said positioning end of said igniter holder is interposed between the lead wires and said stem temporarily secures the igniter in the throat of the engine with a slight interference fit between said stem of said igniter holder and said throat of said model rocket engine, and wherein said igniter holder is adapted to be expelled from the engine following ignition.

2. The igniter holder of claim 1 wherein said stem comprises at least one rib circumferential to said axis and adapted for temporarily securing said igniter holder in the throat of the engine.

3. The igniter holder of claim 1 wherein said stem has an axial length less than the length of the cavity of the model rocket engine and sufficient to form a low air volume cavity within the igniter cavity of the model rocket engine and to ensure maximum thermal transfer of heat energy from the igniter to the surface of the propellant grain in the igniter cavity.

4. The igniter holder of claim 1 wherein said disk-like end of said igniter holder defines a manually-engageable surface for alternatively receiving an installation force and receiving gripping means for extracting the igniter holder from the engine.

5. The igniter holder of claim 1 wherein said stem further comprises a plurality of circumferential ribs adapted for temporarily securing the igniter in the throat of the engine with a slight interference fit therein and adapted for receiving a force of increased internal pressure which results from ignition and which acts on said ribs to expel said igniter holder from the engine throat.

6. The igniter holder according to claim 1 wherein said igniter holder is made of a substantially non-flammable material.

7. The igniter holder of claim 1 wherein said igniter holder is made of a resilient, semi-flexible, substantially non-flammable material capable of being injection molded.

8. The igniter holder of claim 7 wherein said substantially non-flammable material is a synthetic polymer selected from the group consisting of polyethylene, polyurethane polymer, polypropylene, and injection-molded vinyl.

9. An igniter holder for manual insertion into an igniter cavity of a solid propellant model rocket engine to position an igniter, said igniter holder comprising, an axial stem having a first end joined with and terminating in a flat, disk-like end oriented transverse to said stem, and having a second end which is a blunted positioning end, wherein said stem further comprises an axial succession of outwardly projecting circumferential barbs.

10. The igniter holder of claim 9 wherein said stem further comprises a funnel-like flare at a juncture of said stem and said disk-like end.

11. An igniter holder for a solid propellant model rocket engine fitted with an igniter, wherein the engine has a solid propellant grain section defining an igniter cavity connected to the exterior of the engine by a throat, said igniter holder comprising a semi-flexible article having an axis, and having a flat, disk-like end substantially perpendicular to said axis, and a stem projecting from the disk-like end along said axis, and wherein said stem terminates in a positioning end, said stem of said igniter holder being structured for insertion into the throat of said model rocket engine fitted with said igniter, such that said positioning end and said stem temporarily secure the igniter in the throat of the engine with a slight interference fit between said positioning end and stem of said igniter holder and said throat of said model rocket engine, and said igniter holder being further structured to be inserted after the igniter is inserted and to be expelled from the engine following ignition.

12. The igniter holder of claim 11 wherein said stem is structured to provide said interference fit between at least said positioning end of said stem and said throat of said model rocket engine.

* * * * *